(12) United States Patent
Mantha et al.

(10) Patent No.: US 12,137,086 B2
(45) Date of Patent: Nov. 5, 2024

(54) METHOD FOR ROBUST TOKEN GENERATION IN 5G MOBILE CORE NETWORK

(71) Applicant: Cisco Technology, Inc., San Jose, CA (US)

(72) Inventors: Ravi Shankar Mantha, Bangalore (IN); Krishna Chaitanya Mahamkali, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 121 days.

(21) Appl. No.: 17/869,157

(22) Filed: Jul. 20, 2022

(65) Prior Publication Data

US 2024/0031347 A1    Jan. 25, 2024

(51) Int. Cl.
*H04L 9/40* (2022.01)

(52) U.S. Cl.
CPC .................... *H04L 63/08* (2013.01)

(58) Field of Classification Search
CPC ....... H04L 63/10; H04L 63/12; H04L 9/3213; H04L 2209/80; H04L 5/0055; H04L 55/0092; H04L 63/08; H04W 12/08; H04W 48/04
See application file for complete search history.

(56) References Cited

U.S. PATENT DOCUMENTS

| | | | |
|---|---|---|---|
| 9,774,595 B2 * | 9/2017 | Omnes et al. | ...... H04L 63/0853 |
| 2022/0224589 A1 * | 7/2022 | Das | ...... H04L 41/0627 |
| 2023/0019000 A1 * | 1/2023 | Li et al. | ...... H04L 9/32 |

FOREIGN PATENT DOCUMENTS

| | | | | | |
|---|---|---|---|---|---|
| CN | 4 117 343 | A1 * | 11/2023 | ............... | H04L 9/32 |
| EP | 3 886 390 | A1 * | 9/2021 | ............. | H04L 29/06 |
| WO | 2021090171 | A1 | 5/2021 | | |
| WO | 2021189828 | A1 | 9/2021 | | |
| WO | WO2021189828 | * | 9/2021 | ......... | H04L 63/0876 |

(Continued)

OTHER PUBLICATIONS

Jin Cao, A Survey on Security Aspects for 3GPP Networks, IEEE Xplore, vol. 22, Issue 1, Qt. 1, 2020, p. 170-195.*

(Continued)

*Primary Examiner* — Oleg Korsak
(74) *Attorney, Agent, or Firm* — Edell, Shapiro & Finnan, LLC

(57) ABSTRACT

A method comprising: at a network function (NF) repository function (NRF) of a core network that includes a consumer NF and a producer NF: issuing, to the consumer NF, an access token used to access services of the producer NF based on allowed authorization attributes of the producer NF; before expiry of the access token, receiving, from the producer NF, an update message that indicates retiring authorization attributes of the allowed authorization attributes, and storing the retiring authorization attributes; before the expiry of the access token, upon receiving, from the consumer NF, an access token request for a new access token, determining not to authorize the access token request based on the retiring authorization attributes; and based on determining, sending, to the consumer NF, an access token error to enable the consumer NF to migrate service requests to a new producer NF before the expiry.

20 Claims, 6 Drawing Sheets

(56) References Cited

FOREIGN PATENT DOCUMENTS

WO      2021197835 A1    10/2021
WO      2022033478 A1    2/2022

OTHER PUBLICATIONS

Jin Cao, A Business Process-Based Security Enhancement Scheme for the Network Function Service Access Procedure in the 5G Core, Proquest, vol. 22, No. 1, Qt. 1, 2020.*

Authorization of NF service access, 3GPP TSG-SA3 Meeting #100e, CR 0905, ver. 16.3.0, Aug. 17-28, 2020.*

3GPP, "3rd Generation Partnership Project; Technical Specification Group Core Network and Terminals; 5G System; Network Function Repository Services; Stage 3 (Release 16)," Technical Specification, 3GPP TS 29.510 V16.8.0, Jun. 2021, 215 pages.

Nokia, "Authorization of NF service access," 3GPP TSG-SA3 Meeting #100e, S3-201800-r3, Change Request, 33.501, CR 0905, Rev 1, Current Version 16.3.0, Aug. 2020, 16 pages.

* cited by examiner

300

302 — Time T1, producer NF sends:
NFRegister (Allowed Plmns = Plmn1, Plmn2, Plmn3)

304 — Time T2, producer NF sends:
NFUpdate (Retiring Plmn = Plmn1) => Plmn1 is going to retire (but is not yet retired)

306 — Time T3, producer NF sends:
NFUpdate (Retiring Plmn = nil (), Allowed Plmns = Plmn2, Plmn3) => Plmn1 is retired

METHOD FOR ROBUST TOKEN GENERATION IN 5G MOBILE CORE NETWORK

TECHNICAL FIELD

The present disclosure relates to access token generation in a network.

BACKGROUND

Third Generation Partnership Project (3GPP) (also referred to as "5G") network functions (NFs) use open authorization (Oauth) 2.0 ("Oauth2") based authorization to access services. A network function (NF) repository function (NRF) in a 5G core network provides an access token service in a service provider domain for a consumer NF to access services provided by a producer NF. Based on allowed authorization attributes of the producer NF, the NRF issues an access token to the consumer NF with an expiration time. Subsequently, the consumer NF uses the access token before its expiry to access services from the producer NF. During maintenance operations on the producer NF, an operator may configure some of the allowed authorization attributes to retire (and thereby become invalid or removed/unavailable) at a future time. Currently, there is no mechanism available to synchronize the retirement of the allowed authorization attributes with the expiry of the access token across the NRF, the producer NF, and the consumer NF. For example, Oauth2 does not inform the consumer NF that previously allowed authorization attributes of the producer NF are retiring or are no longer valid. Therefore, user equipment (UE) call/procedure failures can result when the consumer NF sends service requests to the producer NF while the access token has not expired but the producer NF has retired some of the allowed authorization attributes, which prevents the producer NF from servicing the service requests.

BRIEF DESCRIPTION OF THE DRAWINGS

FIG. 3 is an illustration of transaction messages corresponding to several transactions of FIGS. 2A and 2B, according to an example embodiment.

DESCRIPTION OF EXAMPLE EMBODIMENTS

Overview

An embodiment includes a method performed at a network function (NF) repository function (NRF) of a core network that includes a consumer NF and a producer NF. The method comprises: issuing, to the consumer NF, an access token used to access services of the producer NF based on allowed authorization attributes for the producer NF; before expiry of the access token, receiving, from the producer NF, an update message that indicates retiring authorization attributes of the allowed authorization attributes that will retire at a future time, and storing the retiring authorization attributes; before the expiry of the access token, upon receiving, from the consumer NF, a new access token request for a new access token for accessing the producer NF, determining not to authorize the new access token request based on the retiring authorization attributes; and based on determining, sending, to the consumer NF, an access token error to enable the consumer NF to migrate service requests to a new producer NF before the expiry.

EXAMPLE EMBODIMENTS

The following terms and abbreviations may be used in the ensuing description and the figures:
  NF (or Nf)—Network function for 5G/3GPP (e.g., session management function (SMF), access and mobility function (AMF), and so on).
  NRF (or Nrf)— NF repository function.
  NSSAI (or Nssai)—Network slice selection assistance information.
  PLMN (or Plmn)—Public land mobile network.
  SNPN (or Snpn)—Stand-alone non-public network.
  NF instance—An instantiation or implementation of an NF.
  NF type—Type of NF, e.g., NRF, AMF, SMF, and so on.
  NF domain—Geographical region in which an NF operates, e.g., US East coast, US West coast, and so on.
  UE— User equipment, e.g., a mobile device, such as a Smartphone or the like.

Figure 1:
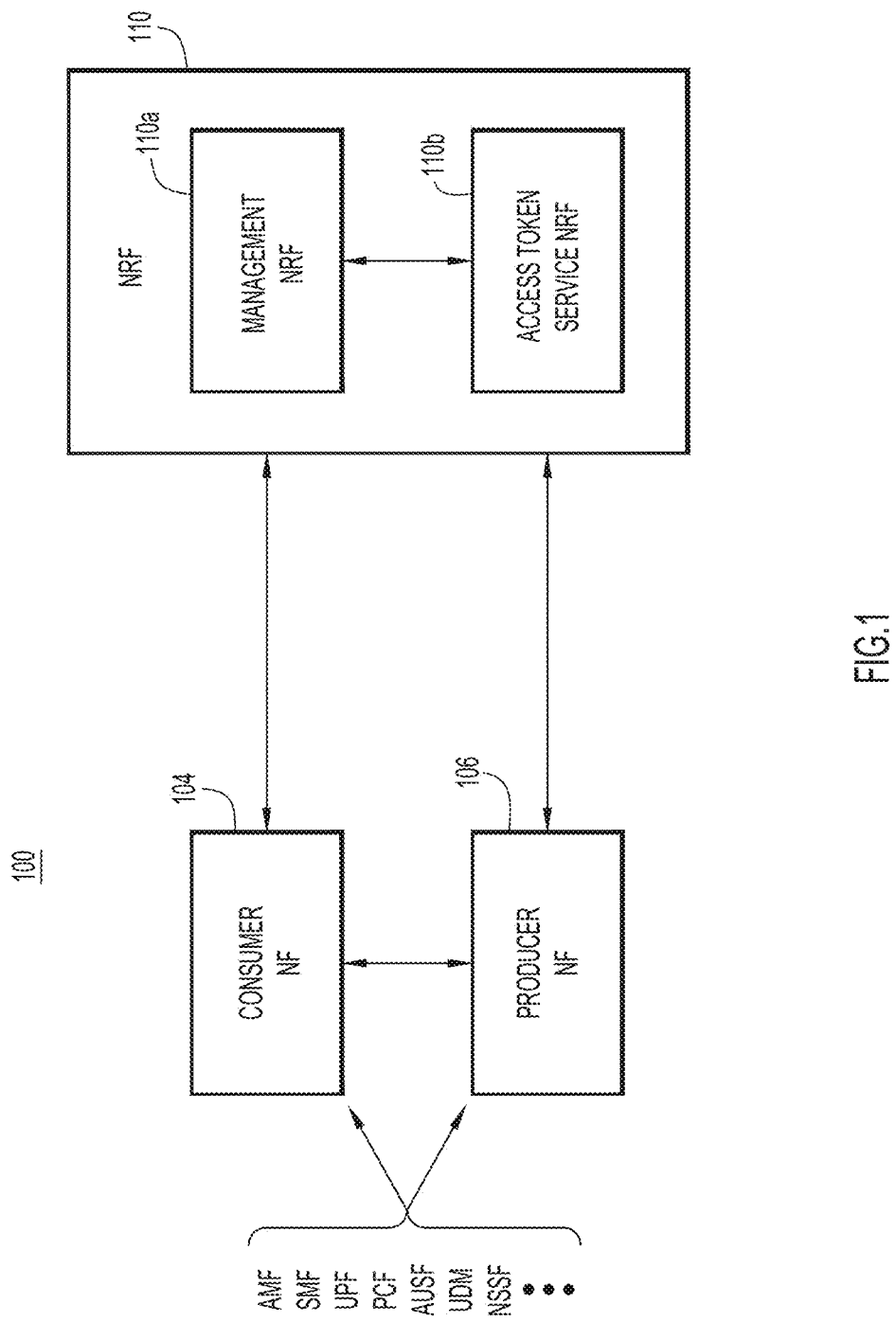
FIG. 1 is a block diagram of network functions of a 5G core network in which embodiments directed to synchronizing retiring of allowed authorization attributes of a producer network function (NF) to/with access token expiry across an NF repository function (NRF), the producer NF, and a consumer NF may be implemented, accordance to an example embodiment.

FIG. 1 is a block diagram of example network functions (NFs) 100 of a 5G core network (also referred to simply as a "5G core") in which embodiments directed to synchronizing the retirement of allowed authorization attributes (also referred to as "parameters") of a producer NF to access token expiry across an NRF, the producer NF, and a consumer NF may be implemented. The embodiments avoid procedure/UE call failures while retiring the allowed authorization attributes. As used herein, a network function represents a functional building block within the 5G core, which has well defined external interfaces and well defined functional behavior. The network function may be an application or service hosted/implemented on a computer device, such as a network node/device, server, or physical appliance, for example. A network function may also be referred to as a "network element" or "entity." A "consumer NF" (also referred to as an "NF consumer") is a network function that consumes network related services provided by another network function, referred to as a "producer NF." A "producer NF" (also referred to as an "NF producer") is a network function that provides network related services that can be consumed by another NF, i.e., by the consumer NF.

Network functions 100 include a consumer NF 104, a producer NF 106, and an NRF 110 that communicate with each other over prescribed network interfaces of the 5G core. Only a single instance of each of consumer NF 104, producer NF 106, and NRF 110 is shown in FIG. 1; however, it is understood that multiple instances of each of the network functions may exist. Consumer NF 104 and producer NF 106 may each be configured as any of a number of NFs/entities of the 5G core as generally defined under the 5G standards, including, but not limited to, an AMF, an SMF, a user plane function (UPF), a policy control function (PCF), an authentication server (AUSF), a unified data management (UDM) function, a network slice selection function (NSSF), and so on. For example, consumer NF 104 and producer NF 106 may represent instances of an AMF→SMF and an SMF→PCF, respectively.

NRF 110 maintains an updated repository of the network functions available in the 5G core (e.g., for consumer NF 104 and producer NF 106) along with the services provided by each of the network functions. NRF 110 includes a management NRF 110a, an access token service NRF 110b, and a discovery service that may be integrated with the management NRF. NRF 110 maintains profiles of the available NF instances and their supported services, allows consumer NF instances to discover other provider NF instances, allows NF instances to track the status of other NF instances, provides an Oauth2 based access token service for consumer NF authorization, and provides specific NF Type selection based on subscriber identity.

As mentioned above, consumer NFs in the 5G core employ Oauth2 based authorization to access services from the producer NFs. More specifically, NRF 110 provides access token service NRF 110b in a service provider domain for the consumer NFs to access services provided by the producer NFs. Based on allowed authorization attributes of the producer NFs, NRF 110, through access token service NRF 110b, issues access tokens to the consumer NFs with expiration times. Subsequently, the consumer NFs uses the access tokens before their expiries to access services from the producer NFs. During maintenance operations on the producer NFs, an operator may configure some of the allowed authorization attributes of the producer NFs to retire, which can prevent the producer NFs from servicing requests from consumer NFs even when the access tokens have not expired. This can lead to dropped UE calls and other undesirable consequences, as described above.

Accordingly, embodiments presented herein synchronize the retirement of allowed authorization attributes of producer NFs to the expiries of the access tokens across NRF 110, the producer NFs, and the consumer NFs to avoid the above-mentioned undesired effects. The synchronization provides the consumer NFs with sufficient notice, before expiries of the access tokens, to gracefully migrate service requests away from producer NFs that will not be able to honor the service requests, due to the retiring authorization attributes, to producer NFs that are able to honor the service requests, which avoids call failures that might otherwise occur.

Figure 2A:
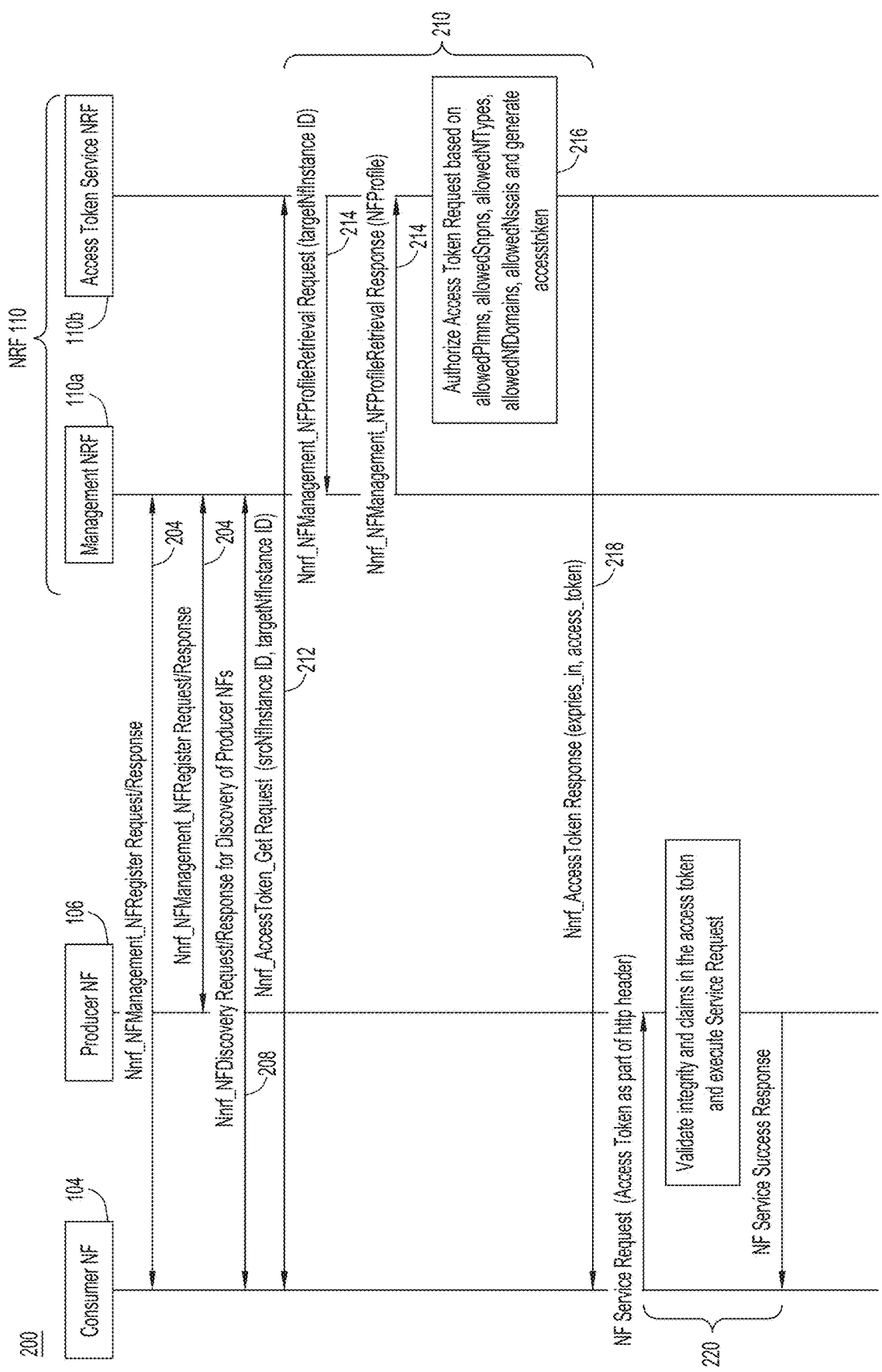
FIGS. 2A and 2B collectively represent a diagram of transactions performed in the 5G core network for synchronizing the retiring of the allowed authorization attributes of the producer NF to the access token expiry across the NRF, the producer NF, and the consumer NF, according to an example embodiment.
Figure 2B:
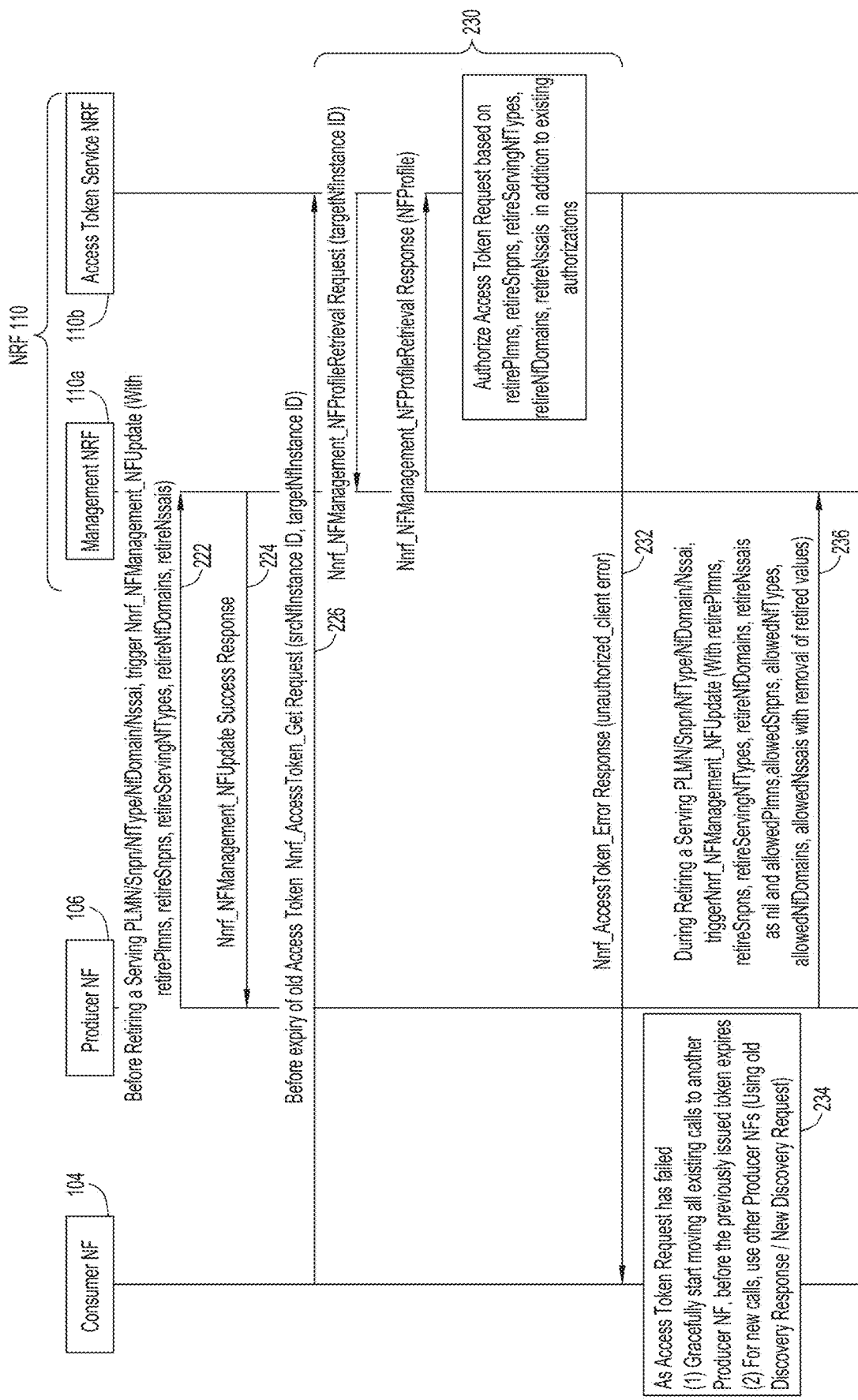

With reference to FIGS. 2A and 2B, there is a diagram of example transactions 200 for synchronizing retirement of allowed authorization attributes of producer NF 106 to access token expiry across NRF 110, the producer NF, and consumer NF 104.

Beginning with FIG. 2A, at 204, consumer NF 104 and producer NF 106 perform respective registration procedures with NRF 110 to register their respective profiles of allowed (i.e., serving) authorization attributes with the NRF. Allowed authorization attributes include allowedPlmns, allowedSnpns, allowedNfTypes, allowedNfDomains, and allowedNssais, for example. Each registration procedure includes an exchange of register request and register response messages (e.g., Nnrf_NFManagement_NFRegister Request and Response) between consumer NF 104 and producer NF 106 and NRF 110, as defined in 3GPP specification 23.510 section 5.2.2.2.

At 208, consumer NF 104 and NRF 110 exchange discovery request and response messages (e.g., Nnrf_NFDiscovery Request/Response) by which the consumer NF discovers producer NFs, including producer NF 106, as per the procedure specified in 3GPP specification 23.510 section 5.3.2.2.

At high-level transaction 210, consumer NF 104 sends to NRF 110 a request for an access token for accessing services provided by producer NF 106, and receives from the NRF an access token with an expiration time for accessing the services, per the procedure specified in 3GPP specification 23.510 section 5.4.2.2. High-level transaction 210 includes the following sub-transactions. At 212, consumer NF 104 sends to access token service NRF 110b an access token request (e.g., Nnrf_AccessToken_Get Request (srcNfInstance ID, targetNfInstance ID)). In response, at 214, management NRF 110a and access token service NRF 110b exchange request and response messages including Nnrf_NFManagement_NFProfileRetrieval Request (targetNfInstance ID) and Nnrf_NFManagement_NFProfileRetrieval Response (NFProfile). In response, at 216, access token service NRF 110b (i) authorizes the access token request from 212 based on (identifiers of allowedPlmns, identifiers of allowedSnpns, allowedNfTypes, allowedNfDomains, allowedNssais) of producer NF 106 that match similar requester/consumer authorization attributes, such as (requesterSnpnList, requesterNssaiList, requesterPlmnList, and so on), received in the access token request from consumer NF 104, and (ii) generates an access token. At 218, access token service NRF 110b sends the access token to consumer NF 104 in an access token response message, e.g., Nnrf_AccessToken Response (expires in [time], access token).

At 220, consumer NF 104 starts sending to producer NF 106 service requests with the access token. producer NF 106 validates the service requests based on the access token, executes the service requests, and provides service to consumer NF 104.

Referring to FIG. 2B, before expiry of the access token, at 222, an operator configures some of the currently allowed authorization attributes (e.g., some of the allowed Plmns/Snpns/NfTypes/NfDomains/Nssais) of producer NF 106 to retire at a time in the future. The allowed authorization attributes configured to retire are referred to as the "retiring authorization attributes." Configuring the retiring authorization attributes triggers producer NF 106 to send to management NRF 110a, before expiry of the access token, and before the future times when the retiring authorization attributes actually retire, an NF update request message (also referred to simply an NF update) that lists the retiring authorization attributes. In an example, the NF update request message may be an NF update message with new information elements (IEs) that list the retiring authorization attributes as retirePlmns, retireSnpns, retireServingNfTypes, retireNfDomains, and retireNssais, for example.

Upon receiving/in response to the NF update request, management NRF 110a stores the retiring authorization attributes for later access and, at 224, sends to producer NF 106 an NF update success response (e.g., Nnrf_NFManagement_NFUpdate Success Response).

In the meantime, consumer NF 104 keeps track of when the access token granted at 210 (referred to as the "current"

or "old" access token) will expire. Before expiry of the current access token, and before the retiring authorization attributes actually retire, at 226, consumer NF 104 sends to access token service NRF 110*b* a request for a new access token (i.e., a new access token request), to replace the current access token, for accessing services provided by producer NF 106. In an example in which the current access token has an expiration period of one hour, consumer NF 104 may send the request for the new access token ten minutes before the one hour period expires.

In response to the new access token request, at high-level transaction 230, NRF 110 performs access token authorization (i.e., determines whether to authorize/grant the new access token) based on a comparison of the retiring authorization attributes of producer NF 106 and the allowed authorization attributes of the producer NF that are not retiring against the requester/consumer authorization attributes (also referred to as simply "requester authorization attributes") received from consumer NF 104 as part of the new access token request. More specifically, management NRF 110*a* and access token service NRF 110*b* (i) exchange NRF management request and response messages (Nnrf_NFManagement_NFProfileRetrieval Request (targetNfInstance ID) and Nnrf_NFManagement_NFProfileRetrieval Response (NFProfile), and (ii) access token service NRF 110*b* determines not to authorize (i.e., to reject/deny) the request for the new access token because of the retiring authorization attributes (e.g., retirePlmns, retireSnpns, retireServingNfTypes, retireNfDomains, and retireNssais). In this case, one or more of the retiring authorization attributes overlap with/match requester authorization attributes of consumer NF 104 provided as part of the new access token request. For example, a retiring Plmn of producer NF 106 may match or be the same as a Plmn to which consumer NF 104 belongs.

In response to the decision not to authorize/grant the new access token (and before the retiring authorization attributes actually retire), at 232, access token service NRF 110*b* sends to consumer NF 104 a failure/client error message (e.g., Nnrf_AccessToken_Error Response (unauthorized_client error)). Sending this error message to consumer NF 104 provides up-front notice, i.e., a warning, to the consumer NF prior to when the retiring authorization attributes actually retire, which gives the consumer NF time to take remedial action, that is, until the expiry of the previously received access token, as described below. Upon receiving the error message that indicates the request for the new access token has failed, at 234, consumer NF 104 (*i*) gracefully moves all existing calls to another/new producer NF, before the current access token expires, and (ii) for new calls, uses other producer NFs, identified using information from the previous discovery procedure, or identified using a new discovery request.

At 236, after transaction 232, while retiring the retiring authorization attributes (i.e., when the retiring authorization attributes actually retire at the future times), producer NF 106 executes an NF update procedure to send to NRF 110 an NF update with indications of the retiring authorization attributes (now retired) and indications of the allowed authorization attributes updated to values based on the retiring values (e.g., send Nnrf_NFManagement_NFUpdate with retirePlmns, retireSnpns, retireServingNfTypes, retireNfDomains, retireNssais as nil, and allowedPlmns, allowedSnpns, allowedNfTypes, allowedNfDomains, allowedNssais updated to reflect removal of the retired attributes). A nil value in place of a retiring authorization attribute indicates that the attribute is retired.

With reference to FIG. 3, there is an illustration of example transaction messages 300 corresponding to several transactions of FIGS. 2A and 2B. At time T1, for transaction 204 from FIG. 2A, producer NF 106 sends to NRF 110 an NF register message 302 listing allowed Plmns served by the producer NF. The allowed Plmns include Plmn1, Plmn2, and Plmn3. Next, at time T2, for transaction 222 from FIG. 2B, producer NF 106 sends to NRF 110 a first NF update message 304 listing retiring Plmns to include Plmn1. NRF 110 interprets this as Plmn1 is going to (i.e., will) retire soon, but is not yet retired, while allowed Plmns Plmn2, Plmn3 remain as serving Plmns that are not going to retire. Next, at time T3, for transaction 236, producer NF 106 sends to NRF 110 a second NF update message 306 listing (i) retired Plmn1 (the "nil ( )" value in place of Plmn1 indicates that Plmn1 is now retired), and (ii) allowed Plmns Plmn2, Plmn3.

Figure 4:
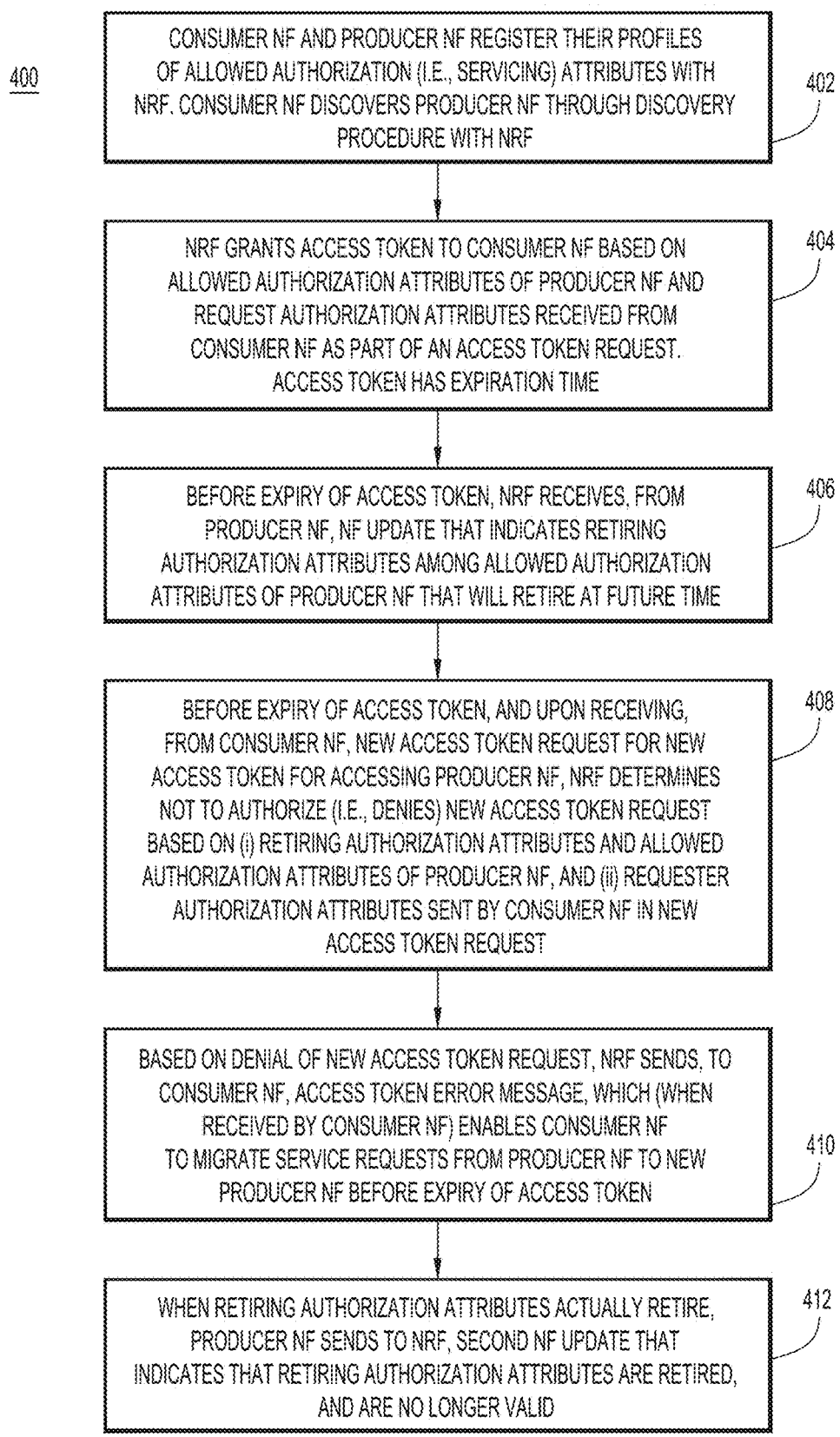
FIG. 4 is a flowchart of a method of synchronizing the retirement of allowed authorization attributes of the producer NF to the expiry of the access token across the NRF, the producer NF, and the consumer NF, according to an example embodiment.

With reference to FIG. 4, there is a flowchart of an example method 400 of synchronizing retirement of authorization attributes of a producer NF (e.g., producer NF 106) with an expiring access token across an NRF (e.g., NRF 110), the producer NF, and a consumer NF (e.g., consumer NF 104). Method 400 may be performed in the 5G core. Method 400 includes operations described above.

At 402, the consumer NF and the producer NF perform registration procedures with the NRF to register their profiles of allowed authorization (i.e., servicing) attributes with the NRF. The consumer NF performs a discovery procedure with the NRF to discover the producer NF.

At 404, the consumer NF requests from the NRF an access token to be used to access services on the producer NF. For example, the consumer NF sends an access token request to the producer NF. The NRF grants the access token to the consumer NF based on the allowed authorization attributes of the producer NF and requester authorization attributes received from the consumer NF as part of the access token request. The access token has an expiration time in the future.

Before expiry of the access token (i.e., before the access token expires), at 406, the NRF receives, from the producer NF, an NF update message that indicates retiring authorization attributes of the allowed authorization attributes of the producer NF that are not currently retired, but will retire (e.g., become invalid or unavailable/removed) at a future time. The NRF stores the retiring authorization attributes, and sends, to the producer NF, an update success response.

Before the expiry of the access token (and before the retiring authorization attributes are retired), and upon receiving, from the consumer NF, a new access token request for a new access token for accessing the producer NF, at 408, the NRF determines not to authorize the new access token request based on a comparison between the retiring authorization attributes and allowed authorization attributes of the producer NF that are not retiring against the requester authorization attributes sent by the consumer NF as part of the new access token request. When there are matches between the retiring authorization attributes and at least some of the requester authorization attributes of the consumer NF as provided with the new access token request, the NRF determines not to authorize the new access token request.

Based on determining not to authorize/grant the new access token request, at 410, the NRF sends, to the consumer NF, an access token error or denial, which (when received by the consumer NF) provides the consumer NF with time to migrate its service requests from the producer NF to a new producer NF before the expiry of the access token and before the retiring authorization attributes are retired, which avoids call failures.

After 410, at 412, when the retiring authorization attributes actually retire, the producer NF sends to the NRF, a second NF update that indicates that the retiring authorization attributes are retired, and are no longer valid.

In summary, embodiments presented herein control token access and its expiration between an NRF and a producer NF in the event that allowed authorization attributes of the producer NF are configured to retire. This facilitates handling of authorization attribute changes on the producer NF and its impact on consumer NFs (and existing UE sessions) in a graceful manner. In the absence of the embodiments, partial deployment changes (delete/move producer NFs across domain/Plmn/Snpns) are disruptive and impact existing sessions on consumer NFs. In the embodiments, a producer NF performs a two-staged maintenance operation in which the producer NF: performs an NF update towards the NRF with indications of retiring authorization attributes; and subsequently performs another NF update towards the NRF with modified allowed authorization attributes. The NRF fetches a producer NF profile and interprets retiring authorization attributes of the producer NF along with allowed authorization attributes and local policies. The NRF does not grant an access token to the consumer NF for accessing the producer NF, when at least some of the consumer NF requester/consumer authorization attributes belong to the retiring authorization attributes of the producer NF. The NF consumer moves existing UE data sessions on the producer NF to a new producer NF before the expiration time of the previous access token grant.

The embodiments presented above have been described in the context of a 5G network; however, the embodiments apply equally well to and may be implemented in other types of networks.

Figure 5:
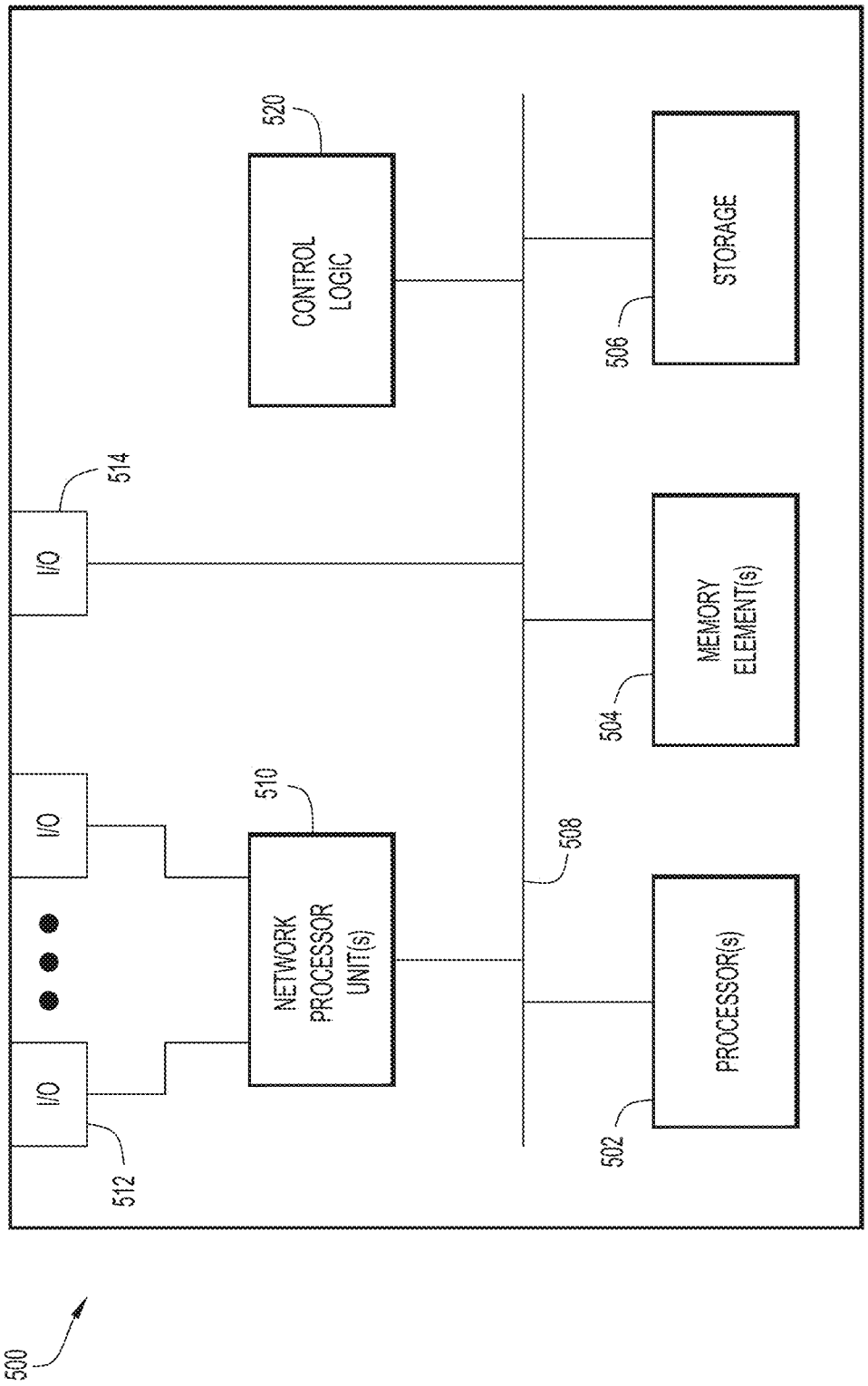
FIG. 5 is a hardware block diagram of a device that may perform functions associated with operations discussed herein, according to an example embodiment.

Referring to FIG. 5, FIG. 5 illustrates a hardware block diagram of a computing device 500 that may perform functions associated with operations discussed herein in connection with the techniques depicted in FIGS. 1-4 In various embodiments, a computing device or apparatus, such as computing device 500 or any combination of computing devices 500, may be configured as any entity/entities as discussed for the techniques depicted in connection with FIGS. 1-4 in order to perform operations of the various techniques discussed herein. For example, computing device 500 or portions thereof may represent consumer NF 104 (e.g., an AMF, SMF, UPF, and so on), producer NF 106 (e.g., an AMF, SMF, UPF, and so on), NRF 110 (including management NRF 110a and access token service NRF 110b), user equipment, and so on.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, attributes, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, attributes, combinations thereof, and/or the like used for operations described herein. This includes memory element(s) 504 and/or storage 506 being able to store data, software, code, instructions (e.g., processor instructions), logic, attributes, combinations thereof, or the like that are executed to conduct operations in accordance with teachings of the present disclosure.

In some instances, software of the present embodiments may be available via a non-transitory computer useable medium (e.g., magnetic, or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IPv4 and/or IPv6addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In some aspects, the techniques described herein relate to a method (e.g., a computer implemented method) performed at a network function (NF) repository function (NRF) of a core network that includes a consumer NF and a producer NF, the method including: issuing, to the consumer NF, an access token used to access services of the producer NF based on allowed authorization attributes for the producer NF; before expiry of the access token, receiving, from the producer NF, an update message that indicates retiring authorization attributes of the allowed authorization attributes that will retire at a future time, and storing the retiring authorization attributes; before the expiry of the access token, upon receiving, from the consumer NF, a new access token request for a new access token for accessing the producer NF, determining not to authorize the new access token request based on the retiring authorization attributes; and based on determining, sending, to the consumer NF, an access token error to enable the consumer NF to migrate service requests to a new producer NF before the expiry.

In some aspects, the techniques described herein relate to a method, further including: when the retiring authorization attributes retire, receiving, from the producer NF, a second update message that indicates the retiring authorization attributes are retired.

In some aspects, the techniques described herein relate to a method, wherein: the retiring authorization attributes include one or more of identifiers of public land mobile networks (Plmns), identifiers of stand-alone non-public networks (Snpns), NF types, NF domains, and network slice selection assistance information (Nssai).

In some aspects, the techniques described herein relate to a method, further including, at the consumer NF: responsive to receiving the access token error, and before the expiry, migrating the service requests to the new producer NF.

In some aspects, the techniques described herein relate to a method, wherein: determining includes determining not to authorize the access token request based on the retiring authorization attributes and the allowed authorization attributes.

In some aspects, the techniques described herein relate to a method, wherein: determining includes determining not to authorize the new access token request when there is a match between at least some of the retiring authorization attributes and requester authorization attributes of the consumer NF as included in the new access token request.

In some aspects, the techniques described herein relate to a method, further including, at the NRF: upon receiving the update message that indicates the retiring authorization attributes, sending, to the producer NF, an update success response.

In some aspects, the techniques described herein relate to a method, wherein the NRF, the consumer NF, and the producer NF include network functions implemented in a 5G core network.

In some aspects, the techniques described herein relate to a method, wherein the NRF includes a management NRF and an access token service NRF.

In some aspects, the techniques described herein relate to an apparatus including: a network function (NF) repository function (NRF) of a core network, the NRF implemented on a computer device and configured to perform: issuing, to a consumer NF, an access token used to access services of a producer NF based on allowed authorization attributes for the producer NF; before expiry of the access token, receiving, from the producer NF, an update message that indicates retiring authorization attributes of the allowed authorization attributes that will retire at a future time, and storing the retiring authorization attributes; before the expiry of the access token, upon receiving, from the consumer NF, a new access token request for a new access token for accessing the producer NF, determining not to authorize the new access token request based on the retiring authorization attributes; and based on determining, sending, to the consumer NF, an access token error to enable the consumer NF to migrate service requests to a new producer NF before the expiry.

In some aspects, the techniques described herein relate to an apparatus, wherein the NRF is further configured to perform: when the retiring authorization attributes retire, receiving, from the producer NF, a second update message that indicates the retiring authorization attributes are retired.

In some aspects, the techniques described herein relate to an apparatus, wherein: the retiring authorization attributes include one or more of identifiers of public land mobile networks (Plmns), identifiers of stand-alone non-public networks (Snpns), NF types, NF domains, and network slice selection assistance information (Nssai).

In some aspects, the techniques described herein relate to an apparatus, wherein: the NRF is configured to perform determining by determining not to authorize the new access token request based on the retiring authorization attributes and the allowed authorization attributes.

In some aspects, the techniques described herein relate to an apparatus, wherein: the NRF is configured to perform determining by determining not to authorize the new access token request when there is a match between at least some of the retiring authorization attributes and requester authorization attributes of the consumer NF as included in the new access token request.

In some aspects, the techniques described herein relate to an apparatus, wherein the NRF is further configured to perform: upon receiving the update message that indicates the retiring authorization attributes, sending, to the producer NF, an update success response.

In some aspects, the techniques described herein relate to an apparatus, wherein the NRF, the consumer NF, and the producer NF include network functions implemented in a 5G core network.

In some aspects, the techniques described herein relate to an apparatus, wherein the NRF includes a management NRF and an access token service NRF.

In some aspects, the techniques described herein relate to a non-transitory computer readable medium (or computer readable media) encoded with instructions that, when executed by a processor of a network function (NF) repository function (NRF) of a core network that includes a consumer NF and a producer NF, cause the processor to perform: issuing, to the consumer NF, an access token used to access services of the producer NF based on allowed authorization attributes for the producer NF; before expiry of the access token, receiving, from the producer NF, an update message that indicates retiring authorization attributes of the allowed authorization attributes that will retire at a future time, and storing the retiring authorization attributes; before the expiry of the access token, upon receiving, from the consumer NF, a new access token request for a new access token for accessing the producer NF, determining not to authorize the new access token request based on the retiring authorization attributes; and based on determining, sending, to the consumer NF, an access token error to enable the consumer NF to migrate service requests to a new producer NF before the expiry.

In some aspects, the techniques described herein relate to a non-transitory computer readable medium, further including instructions to cause the processor to perform: when the retiring authorization attributes retire, receiving, from the producer NF, a second update message that indicates the retiring authorization attributes are retired.

In some aspects, the techniques described herein relate to a non-transitory computer readable medium, wherein: the retiring authorization attributes include one or more of identifiers of public land mobile networks (Plmns), identifiers of stand-alone non-public networks (Snpns), NF types, NF domains, and network slice selection assistance information (Nssai).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method performed at a network function (NF) repository function (NRF) of a core network, the method comprising:
    upon receiving, from a consumer NF, a request to access services of a producer NF, issuing, to the consumer NF, an access token used to access the services, based on allowed authorization attributes for the producer NF and the consumer NF;
    before expiry of the access token, receiving, from the producer NF, an update message that indicates retiring authorization attributes of the allowed authorization attributes that will retire at a future time, and storing the retiring authorization attributes; and
    before the expiry of the access token and before the retiring authorization attributes retire:

upon receiving, from the consumer NF, a new access token request for a new access token for accessing the services of the producer NF, determining not to authorize the new access token request based on the retiring authorization attributes; and based on determining, sending, to the consumer NF, an access token error that provides notice to the consumer NF to migrate service requests to a new producer NF before the expiry and before the retiring authorization attributes retire.

2. The method of claim 1, further comprising:
when the retiring authorization attributes retire, receiving, from the producer NF, a second update message that indicates the retiring authorization attributes are retired.

3. The method of claim 1, wherein:
the retiring authorization attributes include one or more of identifiers of public land mobile networks (Plmns), identifiers of stand-alone non-public networks (Snpns), NF types, NF domains, and network slice selection assistance information (Nssai).

4. The method of claim 1, further comprising, at the consumer NF:
responsive to receiving the access token error, and before the expiry, migrating the service requests to the new producer NF.

5. The method of claim 1, wherein:
determining includes determining not to authorize the new access token request based on the retiring authorization attributes and the allowed authorization attributes.

6. The method of claim 1, wherein:
determining includes determining not to authorize the new access token request when there is a match between at least some of the retiring authorization attributes and requester authorization attributes of the consumer NF as included in the new access token request.

7. The method of claim 1, further comprising, at the NRF:
upon receiving the update message that indicates the retiring authorization attributes, sending, to the producer NF, an update success response.

8. The method of claim 1, wherein the NRF, the consumer NF, and the producer NF include network functions implemented in a 5G core network.

9. The method of claim 1, wherein the NRF includes a management NRF and an access token service NRF.

10. An apparatus comprising:
a network function (NF) repository function (NRF) of a core network, the NRF implemented on a computer device and configured to perform:
upon receiving, from a consumer NF, a request to access services of a producer NF, issuing, to the consumer NF, an access token used to access the services, based on allowed authorization attributes for the producer NF and the consumer NF;
before expiry of the access token, receiving, from the producer NF, an update message that indicates retiring authorization attributes of the allowed authorization attributes that will retire at a future time, and storing the retiring authorization attributes; and
before the expiry of the access token, and before the retiring authorization attributes retire:
upon receiving, from the consumer NF, a new access token request for a new access token for accessing the services of the producer NF, determining not to authorize the new access token request based on the retiring authorization attributes; and
based on determining, sending, to the consumer NF, an access token error that provides notice to the consumer NF to migrate service requests to a new producer NF before the expiry and before the retiring authorization attributes retire.

11. The apparatus of claim 10, wherein the NRF is further configured to perform:
when the retiring authorization attributes retire, receiving, from the producer NF, a second update message that indicates the retiring authorization attributes are retired.

12. The apparatus of claim 10, wherein:
the retiring authorization attributes include one or more of identifiers of public land mobile networks (Plmns), identifiers of stand-alone non-public networks (Snpns), NF types, NF domains, and network slice selection assistance information (Nssai).

13. The apparatus of claim 10, wherein:
the NRF is configured to perform determining by determining not to authorize the new access token request based on the retiring authorization attributes and the allowed authorization attributes.

14. The apparatus of claim 10, wherein:
the NRF is configured to perform determining by determining not to authorize the new access token request when there is a match between at least some of the retiring authorization attributes and requester authorization attributes of the consumer NF as included in the new access token request.

15. The apparatus of claim 10, wherein the NRF is further configured to perform:
upon receiving the update message that indicates the retiring authorization attributes, sending, to the producer NF, an update success response.

16. The apparatus of claim 10, wherein the NRF, the consumer NF, and the producer NF include network functions implemented in a 5G core network.

17. The apparatus of claim 10, wherein the NRF includes a management NRF and an access token service NRF.

18. A non-transitory computer readable medium encoded with instructions that, when executed by a processor of a network function (NF) repository function (NRF) of a core network, cause the processor to perform:
upon receiving, from a consumer NF, a request to access services of a producer NF issuing, to the consumer NF, an access token used to access the services, based on allowed authorization attributes for the producer NF and the consumer NF;
before expiry of the access token, receiving, from the producer NF, an update message that indicates retiring authorization attributes of the allowed authorization attributes that will retire at a future time, and storing the retiring authorization attributes; and
before the expiry of the access token; and before the retiring authorization attributes retire:
upon receiving, from the consumer NF, a new access token request for a new access token for accessing the services of the producer NF, determining not to authorize the new access token request based on the retiring authorization attributes; and
based on determining, sending, to the consumer NF, an access token error that provides notice to the consumer NF to migrate service requests to a new producer NF before the expiry and before the retiring authorization attributes retire.

19. The non-transitory computer readable medium of claim 18, further comprising instructions to cause the processor to perform:
- when the retiring authorization attributes retire, receiving, from the producer NF, a second update message that indicates the retiring authorization attributes are retired.

20. The non-transitory computer readable medium of claim 18, wherein:
- the retiring authorization attributes include one or more of identifiers of public land mobile networks (Plmns), identifiers of stand-alone non-public networks (Snpns), NF types, NF domains, and network slice selection assistance information (Nssai).

\* \* \* \* \*

UNITED STATES PATENT AND TRADEMARK OFFICE
CERTIFICATE OF CORRECTION

| | | |
|---|---|---|
| PATENT NO. | : 12,137,086 B2 | Page 1 of 1 |
| APPLICATION NO. | : 17/869157 | |
| DATED | : November 5, 2024 | |
| INVENTOR(S) | : Ravi Shankar Mantha et al. | |

It is certified that error appears in the above-identified patent and that said Letters Patent is hereby corrected as shown below:

In the Claims

Claim 10, Column 15, Line 61, please replace "before the expiry of the access token, and before the" with --before the expiry of the access token and before the--

Claim 18, Column 16, Line 46, please replace "services of a producer NF issuing, to the consumer NF," with --services of a producer NF, issuing, to the consumer NF,--

Claim 18, Column 16, Line 56, please replace "before the expiry of the access token; and before the" with --before the expiry of the access token and before the--

Signed and Sealed this
Thirty-first Day of December, 2024

Derrick Brent
*Acting Director of the United States Patent and Trademark Office*